US006758745B2

(12) United States Patent
Van Der Haegen et al.

(10) Patent No.: US 6,758,745 B2
(45) Date of Patent: Jul. 6, 2004

(54) TOOL AND METHOD FOR REMOVAL AND INSTALLATION OF THRESHING CONCAVE

(75) Inventors: Johan A. Van Der Haegen, Gavere (BE); André G. J. Dhont, Maldegem (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/370,806

(22) Filed: Feb. 20, 2003

(65) Prior Publication Data

US 2003/0216159 A1 Nov. 20, 2003

(51) Int. Cl.[7] .................................................. A01F 12/24
(52) U.S. Cl. .......................... 460/109; 460/104; 460/59
(58) Field of Search ............................ 460/59, 104, 66, 460/107, 79, 109, 103, 108, 119, 120

(56) References Cited

U.S. PATENT DOCUMENTS

| | | | | |
|---|---|---|---|---|
| 1,099,070 A | * | 6/1914 | McConnell | 460/109 |
| 2,743,728 A | * | 5/1956 | Carlson | 460/109 |
| 2,833,288 A | * | 5/1958 | Scranton | 460/108 |
| 3,470,881 A | * | 10/1969 | Depauw et al. | 460/109 |
| 3,871,384 A | * | 3/1975 | Depauw et al. | 460/109 |
| 4,774,968 A | * | 10/1988 | Spanlang | 460/109 |
| 6,485,364 B1 | * | 11/2002 | Gryspeerdt et al. | 460/107 |
| 6,530,833 B2 | * | 3/2003 | Imel et al. | 460/109 |

* cited by examiner

*Primary Examiner*—Thomas B. Wlil
*Assistant Examiner*—Meredith Petravick
(74) *Attorney, Agent, or Firm*—Rebecca Henkel; Brant T. Maurer

(57) ABSTRACT

A tool that is provided for the removal and the installation of a threshing concave is disclosed. The tool has a pair of spaced support arms for slideably receiving end sections of a threshing concave. The support arms are provided with mechanism for attachment of the arm to the housing. The housing has an inner arm section that extends to one side of the attachment mechanism for supporting the concave inside the housing when the support arm is attached to the housing. The outer arm section extends to the other side of the attachment mechanism for supporting a threshing concave outside the housing when the support arm is attached to the housing.

25 Claims, 5 Drawing Sheets

TOOL AND METHOD FOR REMOVAL AND INSTALLATION OF THRESHING CONCAVE

FIELD OF INVNETION

The present invention generally relates to a mechanism for tool for removing and installing a threshing concave from and to a threshing machine, such as a combine harvester. In particular it relates to a dedicated tool and a method for removing and installing a concave underneath the threshing drum inside the machine housing.

BACKGROUND OF THE INVENTION

Modern combine harvesters can be used for harvesting and threshing a wide range of agricultural products. However, for optimal performance, it is necessary to install components that are more appropriate for the one or other crop type. For example, wheat, barley and rye can be threshed using a drum provided with axially extending rasp bars and a small grain concave having slats extending parallel to the drum axis. For threshing maize (corn), the same drum may be used but the concave should be replaced with a concave having larger apertures between the slats and the wires. Rice requires a drum provided with radially extending teeth and a concave with corresponding, inwardly extending teeth. Accordingly, the transition from one crop type to another often entails the removal of one concave and the installation of a different concave.

The drum and the concave are subject to wear and have to be repaired or replaced at regular intervals to maintain threshing efficiency. This exchange action also requires removal and installation of the concaves.

In recent years, the handling of the concaves has become more cumbersome because of the larger dimensions and hence the increased weight of the concave. Meanwhile, operators have become more demanding and are looking for more comfort and convenience.

This problem may be solved by splitting the concave into three or four more manageable concave sections that are slid into a concave frame that remains attached to the frame. Such structure requires a sturdy concave frame. It also multiplies the total number of attachment points for the concave sections.

Mechanism may be provided for supporting the concave during its movement inside the threshing housing. U.S. Pat. No. 3,871,384 shows the threshing apparatus of an axial flow combine harvester. Supports at the front and rear ends of the concave enable the transport of the concave to an aperture in a side wall of the harvester. However no mechanism are provided for facilitating the removal of the concave from the housing.

In the axial flow combine harvester shown in U.S. Pat. No. 3,470,881 the concave is mounted to a pair of sliding arms that remain attached to the combine. The concave frame cannot be removed from the combine but it can be moved to a service position outside the housing for repairing or replacing the concave bars and wires. For heavier concaves additional support is provided by a movable carriage assembly that adds to the complexity of the machine.

SUMMARY OF INVENTION

It is an object of the present invention to provide a tool and a method that facilitate the manual transfer of a heavy concave from an operative position underneath the threshing drum to a position outside the threshing housing.

In accordance with the first embodiment of this invention, there is provided a mechanism for the removal of a threshing concave from a threshing machine comprising a housing and a rotatable threshing drum mounted inside said housing. The mechanism comprises a pair of spaced support arms for slideably receiving thereon end sections of a threshing concave, characterised in that at least one of the support arms is provided with mechanism for attachment of arm to the housing. The inner arm section extends to one side of the attachment mechanism for supporting the concave inside the housing when the support arm is attached to the housing. An outer arm section extends to the other side of the attachment mechanism for supporting a threshing concave outside the housing when the support arm is attached to the housing.

This mechanism enables the movement of the concave between an operative position below the threshing drum and an accessible position outside the threshing housing.

Preferably, the attachment mechanism comprise pivot mechanism, such as a bushing, allowing pivoting of the inner arm section between an upper position close to the threshing drum and a lower position, more remote from the threshing drum. This helps to reduce the distance between the concave and the support arms when the concave is disconnected from the adjustment mechanism for the concave clearance.

The support arm may be provided with positioning mechanism for placing the inner arm section in the upper or lower position. Such positioning mechanism may comprise a disc that is linked by an eccentric, pivotable connection to the inner arm section. The disc may have an outer diameter adapted to fit in an oblong aperture of the housing wall. The arm may be lifted or lowered by rotating the disc over 180 degrees.

Preferably, the positioning mechanism also comprises a securing mechanism for holding the inner arm section in the upper or lower position. This prevents unwanted tilting of the arms whilst the concave is moved inwardly or outwardly. The positioning mechanism can comprise a pin extending through the disc and urged towards the arm by a resilient mechanism. For example, a spring, for engaging a matching hole in the inner arm section.

In order to keep the disc aligned with the housing wall, the disc may be provided with alignment structure. For example, a circular border having an outer diameter exceeding the smaller of the width or the height of the aperture in the wall.

To ensure that the concave does not slip off the outer arm sections, these may have retaining mechanism, such as guide plates attached to one side or both sides of the arm and an upward ear at the front end of the arm.

According to another aspect of the present invention, there is provided a method for removal and installation of a threshing concave from and to a threshing machine comprising a housing, a rotatable threshing drum mounted inside the housing and a clearance adjustment mechanism for the concave, the method comprising the steps of attaching to the housing mechanism comprising at least one support arm such that an inner arm section extends below the concave and an outer arm section extends outwardly from the housing. Lowering the concave to a position on or adjacent to the inner arm section and releasing the concave from the adjustment mechanism to let the concave rest on the inner arm section. Sliding the concave along the inner and outer arm sections to a position outside the housing. Removing the concave from the outer arm section; and removing the mechanism from the housing.

Preferably, the concave lowering step is preceded by the steps of raising the inner arm section to a position close to the concave and securing the arm in this position. This limits the movement of the concave when it is released from its adjustment mechanism.

Before the concave is slid outwardly, it is advantageous to lower the inner arm section to a position more remote from the threshing drum.

For installation of a concave the following method can be used of attaching a support arm to the housing such that the inner arm section extends below the concave and the outer arm section extends outwardly from the housing. Placing a threshing concave on the outer arm section. Sliding the concave along the outer and inner arm sections into the housing to a position below a threshing drum. Connecting the concave to the adjustment mechanism and raising the concave to lift it off the inner arm section; and removing the mechanism from the housing.

Before the concave is slid inwardly, it is advantageous to lower the inner arm section and to secure it in this lower position. The concave may be connected to the adjustment mechanism after jointly raising the inner arm section and the concave resting thereon and securing the inner arm section in this upper position.

In case the support arm is provided with an eccentric disc, the support arm may be attached to the housing by aligning the disc with the housing wall. This aligning substep may comprise: inclining the disc; inserting the disc from within the housing through an aperture in the housing wall; hooking a border of the disc behind a rim of the aperture; and raising the disc to a vertical position.

Where the disc is connected to the inner arm section by an eccentric, pivotable connection, the raising or lowering step may comprise rotating the disc to raise or lower the eccentric connection. It is also possible to secure the position of the support arm by securing the disc to the inner arm section.

BRIEF DESCRIPTION OF THE DRAWINGS

The invention will now be described further, by way of example, with reference to the accompanying drawings, in that.

DETAILED DESCRIPTION OF THE PREFERRED EMBODIMENT

The terms "grain", "straw", and "tailings" are used principally throughout this specification for convenience and it should be understood that these terms are not intended to be limiting. Thus "grain" refers to that part of the crop that is threshed and separated from the waste part of the crop material that is referred to as "straw". Incompletely threshed ears are referred to as "tailings". Also, the terms "forward", "rearward", "upper", "lower", "left", "right", etc. when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Figure 1:
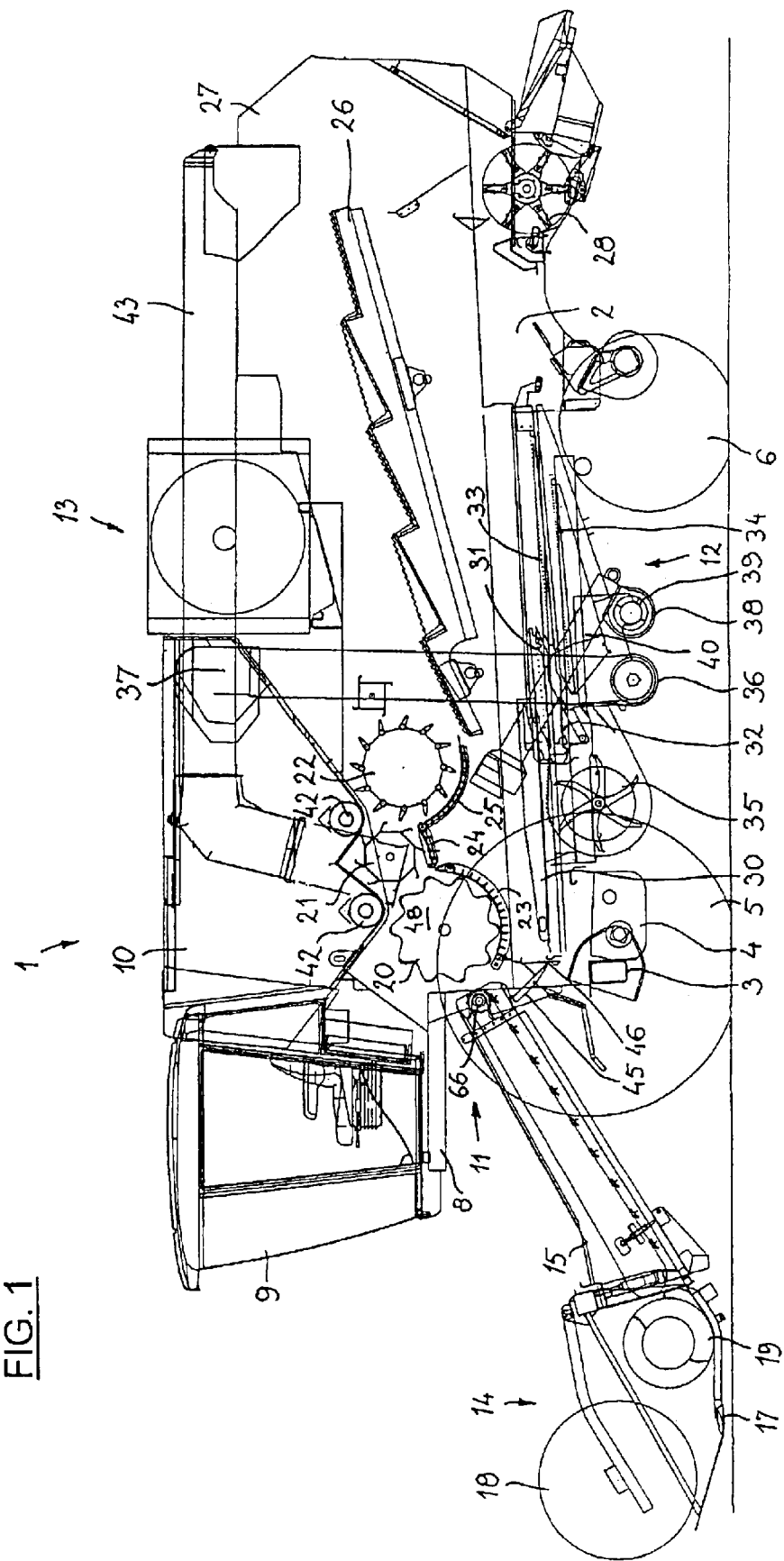
FIG. 1 is a diagrammatic side elevation of a combine harvester, comprising a threshing mechanism.

As illustrated in FIG. 1, a combine harvester, generally indicated at 1, comprises a main chassis or frame 2, supported on a fixed front axle 3 and a oscillating rear axle (not shown). The front axle 3 carries a traction gearbox 4, that is drivingly connected to a pair of drive wheels 5, supporting the front portion of the frame 2. The rear axle is supported by a pair of steerable wheels 6. Mounted onto the main frame 2 are an operator's platform 8, with an operator's cab 9, a grain tank 10, a threshing and separating mechanism 11, a grain cleaning mechanism 12, and a power plant or engine 13. A conventional grain header 14 and straw elevator 15 extend forwardly of the main frame 2 and are pivotally secured thereto for generally vertical movement, that is controlled by extensible hydraulic cylinders (not shown).

As the combine harvester 1 is propelled forwardly over a field with standing crop, the latter is severed from the stubble by a sickle bar 17 at the front of the header 14 and guided by a reel 18 and an auger 19 to the straw elevator 15, that supplies the cut crop to the threshing and separating mechanism 11. The crop received therein is threshed and separated, that is to say, the crop is rubbed and beaten, whereby the grain, seed or the like, is loosened and separated from the straw, crop waste or other discardable part of the crop.

The combine harvester 1, illustrated in FIG. 1, comprises a conventional threshing and separation mechanism 11 including a threshing cylinder or drum 20, a straw beater 21 and a separator rotor 22, co-operating with a set of concaves 23, 24, 25. Conventional straw walkers 26 are operable, in use, to discharge a mat of remaining crop material (i.e. mainly straw as most grain is separated therefrom) through a straw hood 27 to a straw chopper 28 that chops the straw and ejects it onto the field.

Grain that has been separated by the threshing and separating mechanism 11 falls onto a first grain pan 30 of the cleaning mechanism 12, that further also comprises a pre-cleaning sieve 31, positioned above a second grain pan 32, a upper chaffer sieve 33 and a lower grain sieve 34, disposed the one above the other behind and below the pre-cleaning sieve 31, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads the grain across the sieves 31, 33, 34, while permitting the passage of cleaned grain by gravity through the apertures of these sieves. The grain on the sieves 31, 33, 34 is subjected to a cleaning action by the fan 35 that provides an air flow through the sieves to remove chaff and other impurities such as dust from the grain by making this material airborne for discharge from the machine.

Clean grain falls to a clean grain auger (not shown) in a clean grain auger trough 36 and is subsequently transferred by the auger and an elevator mechanism 37 to the grain tank 10. Incompletely threshed ears, the so-called "tailings", fall to a tailings auger (not shown) in a tailings auger trough 38.

The tailings are transported sideways by this auger to a separate rethresher 39 and returned by a tailings elevator 40 to the first grain pan 30 for repeated cleaning action.

A pair of grain tank augers 42 at the bottom of the grain tank 7 is used to urge the clean grain sideways to an unloading tube 43, wherein it is elevated by unloading augers (not shown) for discharge from the harvester 1.

The transition between the straw elevator 15 and the first concave 23 is provided with a stone trap 45 for receiving rock material that was taken in together with the crop material and is knocked downwards by the rasp bars 51 of the rotating threshing drum 20. The trap 45 can be emptied by rotating it forwardly and downwardly about a transverse hinge 46.

The concave 23 is provided with pair of curved side plates 50 between which extend transverse, radially arranged slats. During the threshing process the crop material engages the upper border of these slats. The slats are provided with circular holes through that extend a series of parallel curved rods. The slats and the rods form a grate through that grain and chaff can fall to the grain pan 30.

Figure 2:
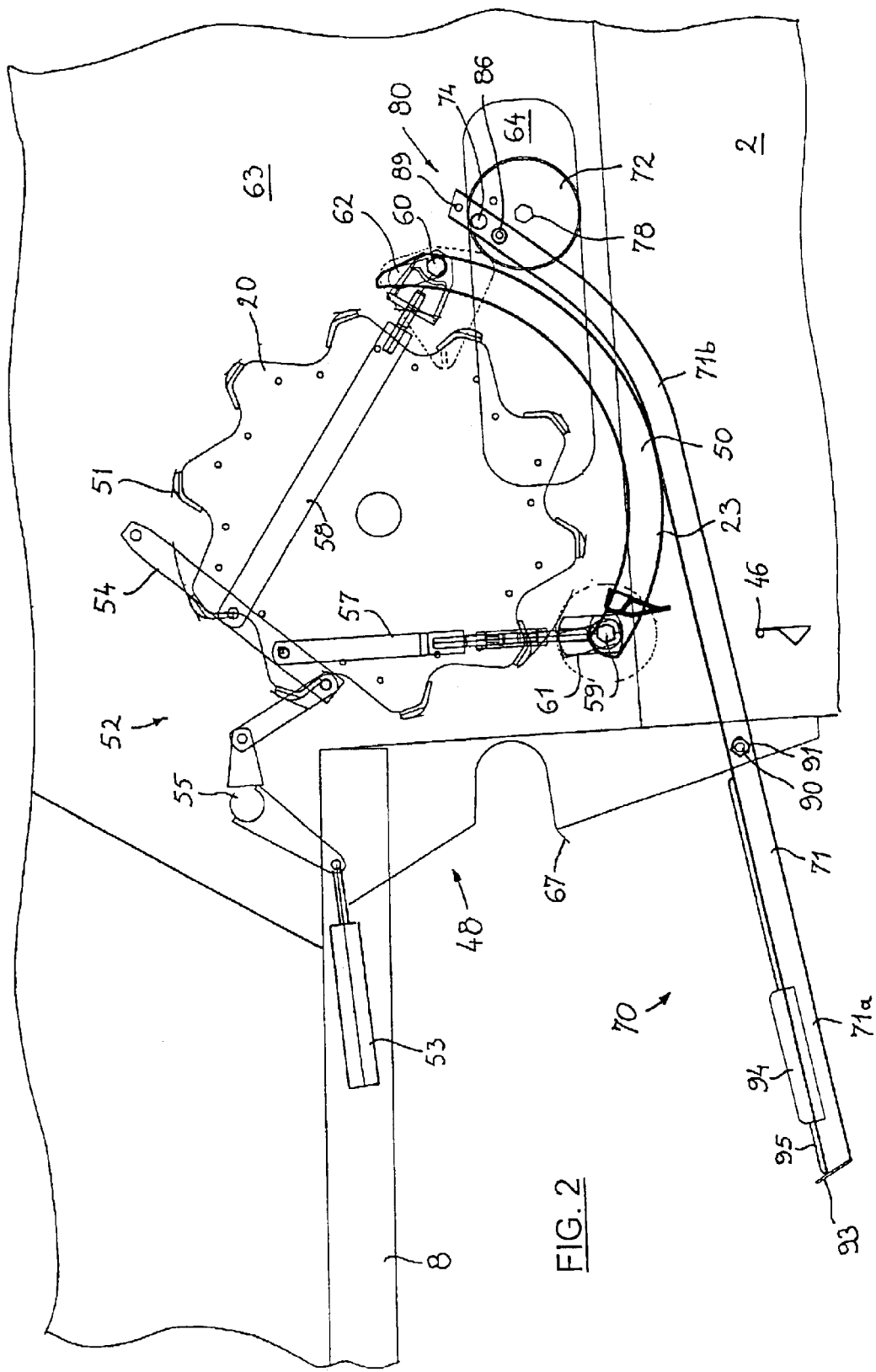
FIG. 2 is an enlarged view of the front portion of the threshing mechanism of FIG. 1, also showing a side view of a removal and installation tool in its upper position.

As shown in FIG. 2, the concave is connected to a concave adjustment mechanism 52 for varying the clearance between the rasp bars 51 and the surface of the concave 50. The mechanism 52 comprises an actuator 53 that is installed below the operator's platform 8. The actuator 53 is connected by a linkage 55 to a pair of pivot arms 54 on both sides of the housing 48 of the threshing mechanism 11. From each pivot arm 54 extend front and rear pull arms 57, 58 that are attached by transverse bolts 59, 60 to the side plates 50 of the concave 23. The front and rear bolts 59, 60 extend through upright front and rear slots 61, 62 in the side walls 63 of the housing 48. The pivot arm 54 can be raised or lowered by extending or retracting the actuator 53 in order to diminish or increase the concave clearance. During its movement, the concave 23 is guided by the bolts 59, 60 in the upright slots 61, 62. Adjacent the rear end of the concave 23, both housing walls 63 are provided with an oblong servicing aperture 64 giving access to the concave 23 and the area above the grain pan 30.

The straw elevator 15 pivots about a rear shaft 66 (FIG. 1) that is received in a pair of brackets 67 attached to the housing 48. In order to gain access to the front of the concave 23, the straw elevator 15 is removed from the brackets 67 and the stone trap 45 is rotated forwardly and rearwardly about its hinge 46.

Figure 6:
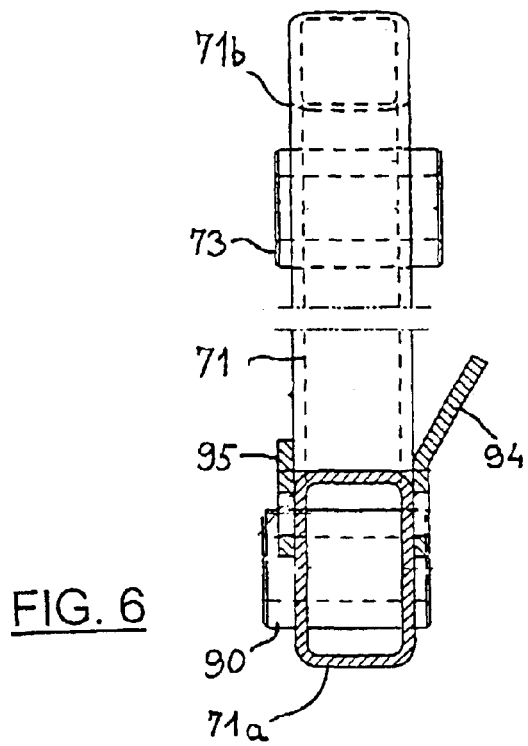
FIG. 6 is a cross sectional view of the front section of the removal tool taken on the line VI—VI in FIG. 3.

The combine harvester 1 is now ready for insertion of concave removal mechanism 70. The mechanism consists of a pair of tubular support arms 71 having a rectangular cross section as shown in FIG. 6. The rear end of the support arm 71 curves upwardly and is rotatably connected to a disc 72.

Figure 5:
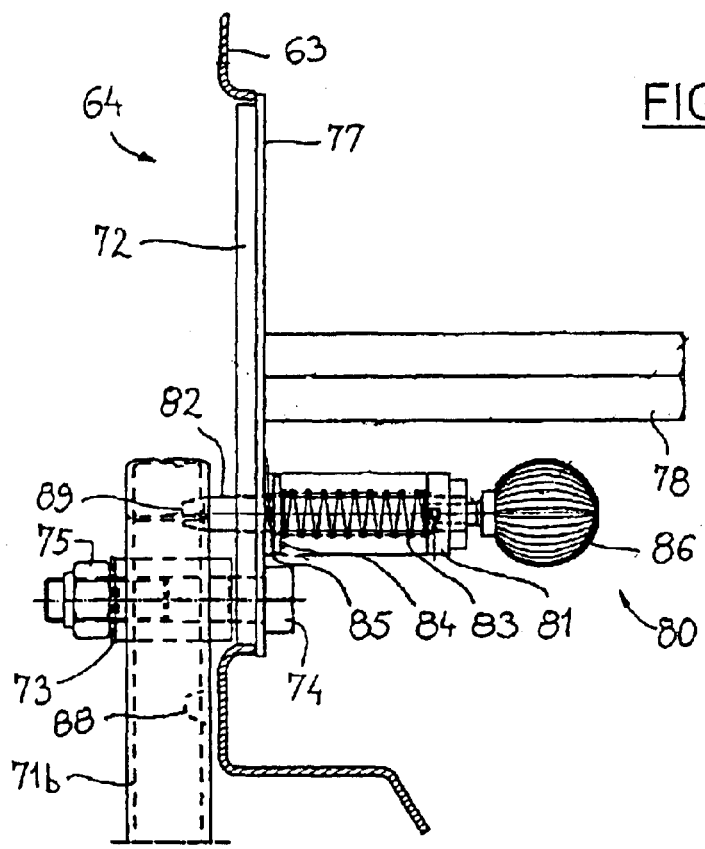
FIG. 5 is a cross sectional view of the rear section of the removal tool taken on the line V—V in FIG. 3.

As can be seen in FIG. 5, the rotatable connection comprises a bolt 74 extending through the disc 72 at a location distant from the disc centre, and through a bushing 73 welded to the rear section 71b of the support arm 71. The bolt 74 is secured, but not tightened by a lock nut 75. The diameter of the disc 72 is only slightly smaller than the height of the oblong aperture 64. The surface of the disc 72 facing away from the arm 71 has a circular border 77 with a diameter that is slightly greater than the height of the aperture. A hexagonal shaft 78 is welded to the centre of the disc 72 to form an appropriate application point for a standard wrench when the operator wishes to rotate the disc inside the aperture 64.

The disc 72 is also provided with locking mechanism 80 for holding the support arm 71 in the one or other position relative to the disc 72. The locking mechanism comprise a bracket 81 that is welded to the outer surface of the disc and a locking pin 82 mounted through holes in the bracket 81 and the disc 72. The pin 82 is forced inwardly by a spring 83 that is mounted over the pin and engages a washer 84 that is retained by a cotter pin 85 extending through the shaft of the locking pin. The operator can pull the pin 82 outwardly by mechanism of knob 86 mounted to the outward end of the pin. The inner arm section 71b is provided with a pair of matching holes 88, 89 on each side of the pivot bolt 74. The tip of the locking pin 82 can be inserted into one of these holes 88 or 89 by rotating the disc 72 until the tip of the pin hits the upper or lower surface of the arm 71, pulling the knob 86 and the pin 82 outwardly, rotating the disc a little further to align the pin with the selected hole 88 or 89 and releasing the knob 86. In this manner the disc 72 is locked in a fixed position to the rear section of the support arm 71.

A bushing 90 is welded to the side walls of the support arm 71, between its front and rear sections. A bolt 91 can be inserted into the bushing 90 to connect the support arm to the harvester frame 2 and to provide a pivot about that the support arm 71 can rotate during removal and mounting operations.

At its front end the support arm 71 has an upwardly extending, front retainer plate or ear 93 for retaining the concave 23 when it is slid forwardly along the support arm. As shown in FIG. 6, the front section 71a of the support is also provided with outer and inner guide plates 94, 95 for keeping the side plates 50 of the concave 23 from sliding off the top surface of the support arm 71.

When the operator wishes to remove a concave 23 from the machine using the mechanism 70, he first has to remove the straw elevator 15 from the harvester frame 2 and to open the stone trap 45 as indicated above. The covers of the apertures 64 in the side walls 63 are equally removed. Then the operator can slip the discs 72 of the support mechanism 70 from within the housing 48 through the apertures 64. As the discs 72 have a border 77 extending beyond the height of the aperture, the discs must be guided through the aperture in an inclined position. When the disc 72 is on the other side of the wall 63, the support arm 64 is rotated back such that the disc assumes a vertical position in the aperture 64. The disc border 77 hooks behind the rim of the aperture to keep the disc flush with the wall 63.

A bolt 91 is then inserted through the bushing 90 between the inner and outer sections 71b, 71a of the support arm 71 to secure the arm to the harvester 1. When both support arms 71 are attached to the frame 2, their inner section 71b is put in the upper position by pulling the knob 86 outwardly and using a wrench to rotate the disc 72 inside the aperture 64 until the eccentric bolt connection 74 reaches it highest position. The knob 86 then is released to insert the locking pin 82 in the lower locking hole 88 of the support arm 71. The arm 71 has assumed the inclined position shown in FIG. 2.

When both support arms 71 are secured in their upper position, the actuator 53 of the concave adjustment mechanism 52 is retracted to lower the concave 29 until its side plates 50 nearly or completely engage the inner arm section 71b. Then the bolts 60 can be removed to detach the rear of the concave 29 from the adjustment mechanism 52. This part of the concave now rests on the support arms 71. Next the locking pins 82 are pulled out of the locking holes 88 and the disc is rotated 180 degrees to lower the inner arm sections 71b. The discs are secured again by inserting the locking pins in the higher locking holes 89. The concave 29 rotates slightly about the front bolts 59 and assumes the position shown in FIG. 3.

In the next step, also the front bolts 59 are removed to fully release the concave 29 from the adjustment mechanism 52. The operator now can pull the concave 29 forwardly along the support arms 71 from between the walls 63. In order to get the rear part of the concave 29 past the threshing drum 20, it may be required to lift the front end of the concave a little, such that the rear end assumes a position against the inner arm section 71b and below the rasp bars 51. While the concave side plates 50 slide along the rear arm section 71b, the walls 63 keep the concave 19 from twisting or sliding off support arms 71.

When the concave 29 reaches the mouth of the threshing housing 48, the inner guide plates 95 that are connected to the sides of the outer arm sections 71a prevent that the concave plates 50 slip off the support arms. The concave 29 is pulled safely to its front position shown in FIG. 4. It is now readily accessible for removing it from the harvester 1 using appropriate lift mechanism. For example, a lift truck or a wheel loader. In this position it is also possible to do some minor repair work. For example, replacement of damaged curved rods in the concave 29, or to thoroughly clean the concave grate. When the concave 29 has been taken off the support arms 71, these arms can be removed by removing the bolts 91 from the front of the harvester 1 and inclining the discs 72 such that they can be retracted through the apertures 64.

Figure 4:
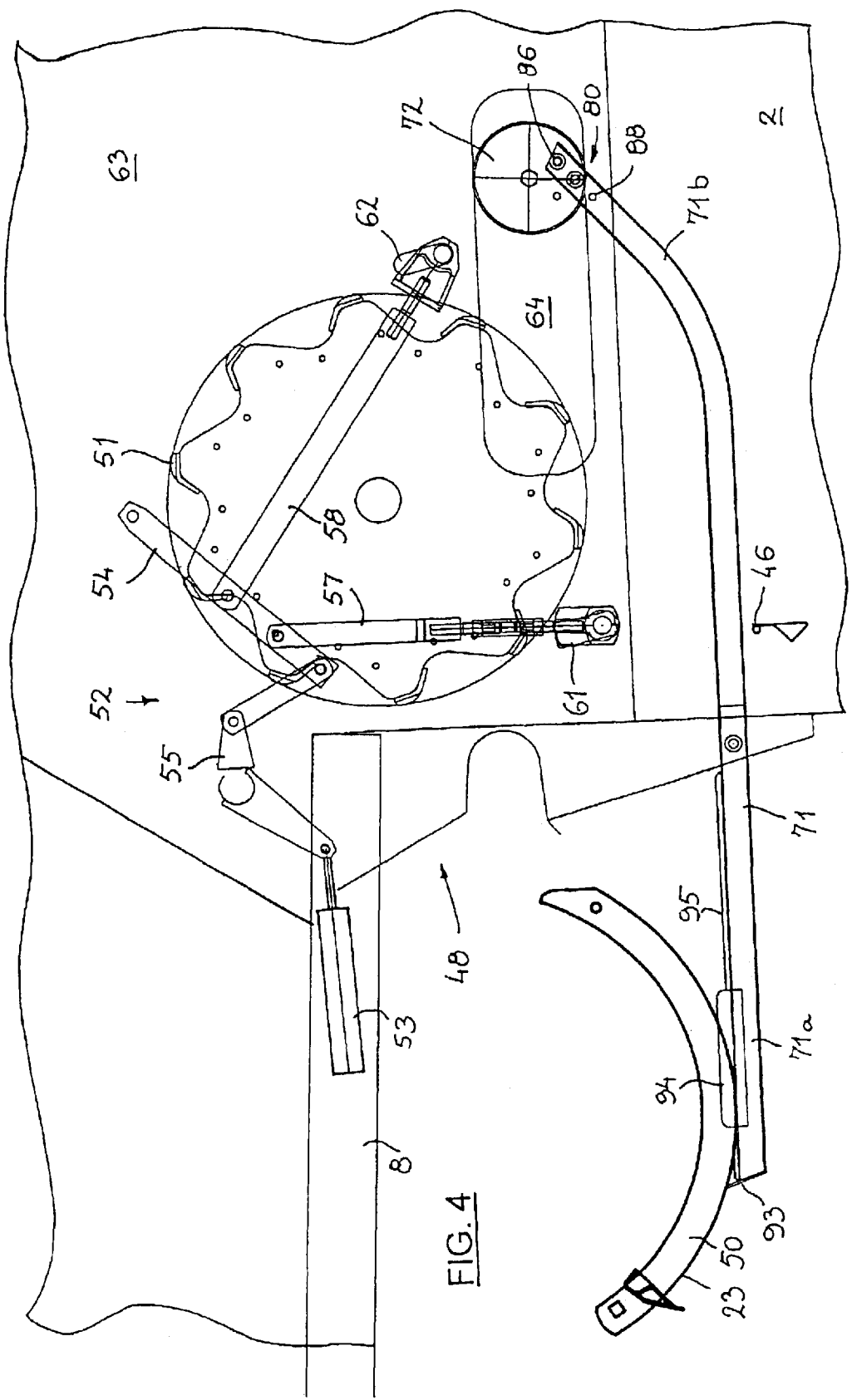
FIG. 4 is a view similar to FIG. 3, showing the concave in a front position.

To reinstall the concave or to install another concave the operations above have to executed in the opposite order. First, the support arms 71 and their discs 72 have to be reinstalled in the same manner as described above. However, now the rear section 71b has to be secured in its lower position by rotating the disc 72 until eccentric connection bushing 73 is located below the hex shaft 78, and inserting the locking pin 82 in the upper locking hole 89. The concave 29 can now safely be placed onto the outer arm sections 71a as shown in FIG. 4. The outwardly bent side plates 94 on the side of the arms 71 (FIG. 6) assist in properly depositing the concave side plates 50 on the top surface of the arms.

Figure 3:
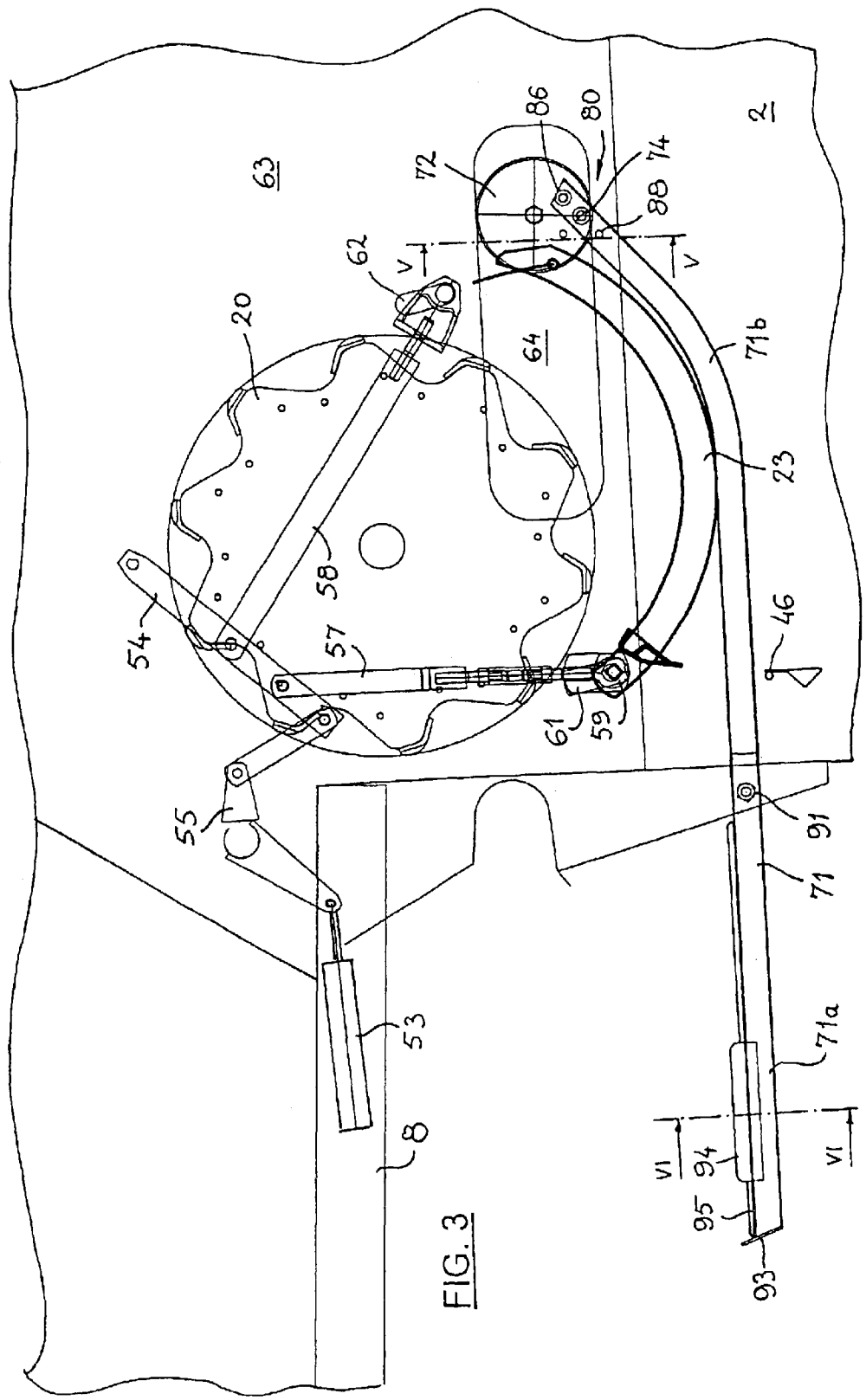
FIG. 3 is a view similar to FIG. 2, showing the, removal tool in its lower position and the concave of the threshing mechanism having its rear end detached from the concave adjustment mechanism.

The concave 29 then is pushed rearwardly along the outer arm sections 71a and into the threshing housing 48. The front section of the concave 29 is lifted to make the rear end pass through the restricted area between the threshing drum 20 and the rear support arm sections 71b. When the concave 29 has reached its position below the drum 20, the front end of the concave 29 is attached by the nuts and bolts 59 to the front pull arms 57 of the adjustment mechanism 52 as shown in FIG. 3. With the front end secured, the rear end of the concave 29 now is raised by releasing the locking pin 82 of the locking mechanism 80, using a wrench to rotate the disc 72 180 degrees and raise its eccentric connection to the rear arm section 71b. In this upper position the support arm is secured by inserting the locking pin 82 in the lower locking hole 88 of the arm 71. The rear end of the concave 29 is now connected to the rear adjustment arm 58 by mechanism of the nuts and bolts 60. Finally the pivot bolts 91 between the inner and outer support arm sections 71a, 71b are removed for releasing the arms. The discs 72 are rotated to withdraw them through the apertures 64 and to take the removal and installation mechanism 70 out of the harvester 1. The concave 29 is now ready for readjustment by extending or retracting the actuator 53. The straw elevator 15 is mounted back to the frame brackets 67 and the stone trap 45 is closed again.

It will be appreciated that, although the invention has been described with reference to a particular type of threshing machine, still other embodiments can be thought of without departing from the original idea of the invention as defined by the claims. For example, a similar mechanism can be used for sideways removal of a threshing and/or separation concave from an axial flow combine harvester. The length of the oblong hole in the side wall does not need to be longer than its height. The insertion of the disc can also be effected when the height exceeds the length and the diameter of the disc is slightly less than the length of the aperture.

It will be understood that changes in the details, materials, steps and arrangements of parts that have been described and illustrated to explain the nature of the invention will occur to and may be made by those skilled in the art upon reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A mechanism for the removal of an elongated threshing concave from a combine harvester, said harvester including a housing and a rotatable elongate threshing drum mounted inside said housing, said mechanism comprising:
   a pair of spaced support arms for slidably receiving thereon respective end sections of said concave; at least one of said support arm removably pivotably attached to said housing by a pivot device and further includes:
   an inner arm section extending to one side of said pivot device for supporting said concave inside said housing when said support arm is attached to said housing; and
   an outer arm section extending to the other side of said pivot device for supporting said concave outside said housing when said support arm is attached to said housing.

2. The mechanism of claim 1, wherein:
   said pivot device allows pivoting of said inner arm section between a position in which said inner arm section extends close to said threshing drum and a lower position in which said inner arm section is more remote from said threshing drum.

3. The mechanism of claim 2, wherein:
   said at least one support arm further includes positioning apparatus for placing said inner arm section in either an upper position in which said inner arm section extends close to said threshing drum or a lower position in which said inner arm section is more remote from said threshing drum.

4. The mechanism of claim 3, wherein:
   said positioning apparatus further comprises a disc having an outer diameter adapted to fit in an oblong aperture in a wall of said housing, and an eccentric, pivotable connection to said inner arm section.

5. The mechanism of claim 4, wherein:
   said positioning apparatus further comprises a securing device for releasably holding said inner arm section in said upper or lower position.

6. The mechanism of claim 5, wherein:
   said securing device comprises a pin extending through said disc adjacent said eccentric connection, a compression spring mounted to said disc for urging said pin towards said inner arm section and a matching hole in said inner arm section adjacent said eccentric connection for receiving the tip of said pin.

7. The mechanism of claim 6, wherein:
said disc is provided with an alignment mechanism for keeping said disc aligned with a wall of said housing.

8. The mechanism of claim 7, wherein:
said alignment mechanism comprises a circular border extending from said disc and having an outer diameter exceeding the smaller of the height or width of said oblong aperture in said housing wall.

9. The mechanism of claim 8, wherein:
said outer arm section is provided with a retainer for retaining said threshing concave on said outer arm section when said concave is supported outside said housing.

10. The mechanism of claim 9, wherein:
said retainer comprises a guide plate attached to one side of said outer arm section and extending upwardly therefrom for retaining a side plate of said concave.

11. The mechanism of claim 10, wherein:
said retainer further comprises a further guide plate attached to the other side of said outer arm section.

12. The mechanism of claim 11, wherein:
said retainer further includes an upward ear extending from the front end of said outer arm section for retaining said concave at the front end of said support arm.

13. The method for removal and installation of a threshing concave from and to an agricultural threshing machine, said threshing machine including a housing, a rotatable threshing drum mounted inside said housing and a clearance adjustment mechanism for said concave, said method comprising the steps of:
a. attaching to said housing a removal and installation mechanism comprising at least one support arm such that an inner arm section extends below said concave and an outer arm section extends outwardly from said housing;
b. lowering said concave to a position on or adjacent to said inner arm section and releasing said concave from said adjustment mechanism to let said concave rest on said inner arm section;
c. sliding said concave along said inner and outer sections to a position outside said housing;
d. removing said concave from said outer arm section; and
e. removing said removal and installation mechanism from said housing.

14. The method according to claim 13, characterised in that said concave lowering step is preceded by the steps of:
raising said inner arm section to upper position close to said concave; and
securing said inner arm section in said upper position.

15. The method according to claim 14, characterised in that said concave lowering step is preceded by the steps of:
releasing said inner arm section and lowering it together with said concave to a lower position more remote from said drum.

16. The method according to claim 15, characterised in that it comprises the further steps of:
attaching said support arm to said housing such that said inner arm section extends below said concave and said outer arm section extends outwardly from said housing;
placing said concave on said outer arm section;
sliding said concave along said outer and inner arm sections into said housing to a position below said removal and installation mechanism;
connecting said concave to said adjustment mechanism and raising said concave to lift it off said inner arm section; and
removing said mechanism from said housing.

17. The method according to claim 16, characterised in said inward sliding steps is preceded by the steps of:
lowering said inner arm section to a lower position remote from said drum; and
securing said inner arm section in said lower position.

18. The method according to claim 17, characterised in that said concave connecting step is preceded by the steps of:
raising said inner arm section together with said concave to an upper position close to said drum; and
securing said inner arm section in said upper position.

19. The method according to claim 18, characterised in that said concave connecting step comprises the sub-step of:
pivotably attaching said support arm to said housing at a location between said outer and inner arm sections.

20. The method according to claim 19, characterised in that:
said support arm is provided with a disc having an outer diameter adapted to fit in an oblong aperture in a wall of said housing; and
said attaching step comprises the sub-step of:
aligning said disc with said wall.

21. The method according to claim 20, characterised in that said disc is provided with a circular border extending from said disc and having an outer diameter exceeding the larger of the height or width of said oblong aperture in said wall; and in that said aligning sub-step comprises:
inclining said disc;
inserting said disc through said aperture from within said housing;
hooking said border behind a rim of said aperture; and
raising said disc to an upright position to align said disc with said wall.

22. The method according to claim 21, characterised in that:
said disc is connected to said inner arm section by an eccentric, pivotable connection; and
said raising or lowering step comprises rotating said disc inside said aperture to raise or lower said eccentric connection and said inner arm section.

23. The method according to claim 22, characterised in that in that said securing step comprises:
securing said disc to said inner arm section.

24. The method according to claim 23, characterised in that:
said disc is provided with a pin extending therethrough and said inner arm section is provided a matching hole on both sides of said eccentric connection; and
said securing step comprises a inserting said pin in one of said matching holes.

25. The method according to claim 24, characterised in that the inward sliding step comprises:
sliding said concave along a guide plate mounted on the side of said outer arm section.

* * * * *